US012260804B2

(12) United States Patent
Liao et al.

(10) Patent No.: US 12,260,804 B2
(45) Date of Patent: Mar. 25, 2025

(54) PIXEL CIRCUIT AND DISPLAY PANEL

(71) Applicant: PlayNitride Display Co., Ltd., MiaoLi County (TW)

(72) Inventors: Kuan-Yung Liao, MiaoLi County (TW); Yun-Li Li, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 18/085,537

(22) Filed: Dec. 20, 2022

(65) Prior Publication Data

US 2024/0185761 A1 Jun. 6, 2024

(30) Foreign Application Priority Data

Dec. 6, 2022 (TW) ................................ 111146719

(51) Int. Cl.
*G09G 3/20* (2006.01)

(52) U.S. Cl.
CPC ......... *G09G 3/2096* (2013.01); *G09G 3/2074* (2013.01); *G09G 2300/0842* (2013.01); *G09G 2310/0291* (2013.01); *G09G 2310/08* (2013.01); *G09G 2320/0626* (2013.01)

(58) Field of Classification Search
CPC .......... G09G 3/32; G09G 3/20; G09G 3/2096; G09G 3/2074; G09G 2300/0842; G09G 2310/0291; G09G 2310/08; G09G 2320/0626
See application file for complete search history.

(56) References Cited

U.S. PATENT DOCUMENTS

| | | | | |
|---|---|---|---|---|
| 10,348,282 | B1 * | 7/2019 | Lesso | H03K 5/135 |
| 11,263,938 | B1 * | 3/2022 | Dong | G09G 3/3426 |
| 2006/0055687 | A1 | 3/2006 | Sheu et al. | |
| 2017/0012538 | A1 * | 1/2017 | Barrenscheen | H02M 3/33507 |
| 2018/0293929 | A1 * | 10/2018 | Shigeta | G09G 3/3233 |
| 2021/0174734 | A1 | 6/2021 | Takahashi et al. | |
| 2021/0407408 | A1 | 12/2021 | Yang et al. | |

(Continued)

FOREIGN PATENT DOCUMENTS

| | | |
|---|---|---|
| CN | 101436386 | 5/2009 |
| CN | 102932985 | 2/2013 |

(Continued)

OTHER PUBLICATIONS

"Office Action of Taiwan Counterpart Application", issued on Nov. 30, 2023, p. 1-p. 6.

(Continued)

*Primary Examiner* — Michael A Faragalla
(74) *Attorney, Agent, or Firm* — JCIPRNET

(57) ABSTRACT

A pixel circuit includes a current generator, a switch, and a time controller. The pixel circuit is configured in a display panel. The current generator provides a driving current, and controls the driving current according to a pulse amplitude modulation mechanism. The switch is coupled in series with the current generator and a light-emitting component, and is turned on or off according to a control signal, wherein the control signal is a pulse width modulation signal. The time controller generates the control signal, receives a set voltage, and adjusts a pulse width of the control signal according to a voltage value of the set voltage.

13 Claims, 6 Drawing Sheets

(56) References Cited

U.S. PATENT DOCUMENTS

| | | | | |
|---|---|---|---|---|
| 2022/0039231 | A1 | 2/2022 | Yeh et al. | |
| 2022/0114951 | A1 | 4/2022 | Chang et al. | |
| 2022/0278673 | A1* | 9/2022 | Rohleder | H04B 5/79 |
| 2023/0104084 | A1* | 4/2023 | Yang | G09G 3/32<br>345/691 |

FOREIGN PATENT DOCUMENTS

| | | |
|---|---|---|
| CN | 103971633 | 8/2014 |
| CN | 106469539 | 3/2017 |
| TW | 200514478 | 4/2005 |
| TW | 202241212 | 10/2022 |

OTHER PUBLICATIONS

"Office Action of China Counterpart Application", issued on Aug. 29, 2024, p. 1-p. 10.

* cited by examiner

PIXEL CIRCUIT AND DISPLAY PANEL

CROSS-REFERENCE TO RELATED APPLICATION

This application claims the priority benefit of Taiwan application serial no. 111146719, filed on Dec. 6, 2022. The entirety of the above-mentioned patent application is hereby incorporated by reference herein and made a part of this specification.

BACKGROUND

Technical Field

The disclosure relates to a pixel circuit, and in particular, to a pixel circuit capable of reducing the requirement on the control precision of components.

Description of Related Art

In the known technical field, when the number of gray scales of the display image displayed by the pixel circuit in the display panel is too large, precise control is required. In micro display panels with higher resolution requirements, finer control of the luminous brightness provided by micro light-emitting components are more stringent. Taking display data with 16 bits as an example, it is difficult to precisely slice the brightness of the display component whether through the light-emitting time or the driving current. Moreover, in the driving circuit, the electronic components are affected by factors such as resistance, parasitic capacitance, electrical characteristics of the light-emitting component, and environmental parameters, which reduces the control precision that may be achieved and the luminous efficiency of the display panel.

SUMMARY

The disclosure provides a pixel circuit and a display panel, which may improve the precision of the display brightness.

A pixel circuit of the disclosure includes a current generator, a switch, and a time controller. The pixel circuit is configured in a display panel. The current generator provides a driving current, and controls the driving current according to a pulse amplitude modulation (PAM) mechanism. The switch is coupled in series with the current generator and a light-emitting component, and is turned on or off according to a control signal, wherein the control signal is a pulse width modulation (PWM) signal. The time controller generates the control signal, receives a set voltage, and adjusts a pulse width of the control signal according to a voltage value of the set voltage.

A display panel of the disclosure includes multiple sub-pixels configured in a matrix. The sub-pixel includes a pixel circuit. The pixel circuit includes a current generator, a switch, and a time controller. The current generator provides a driving current, and controls the driving current according to a pulse amplitude modulation mechanism. The switch is coupled in series with the current generator and a light-emitting component, and is turned on or off according to a control signal, wherein the control signal is a pulse width modulation signal. The time controller generates the control signal, receives a set voltage, and adjusts a pulse width of the control signal according to a voltage value of the set voltage.

Based on the above, the pixel circuit of the disclosure may adjust the brightness through the control signal, wherein the control signal is the pulse width modulation signal. Specifically, the width of the control signal reflects the lighting ratio of the pixel circuit in a unit time period. In this way, the pixel circuit may slice the gray scale value through the control signal generated by the time controller, thereby reducing the requirement on the control precision of the components.

DESCRIPTION OF THE EMBODIMENTS

Figure 1:
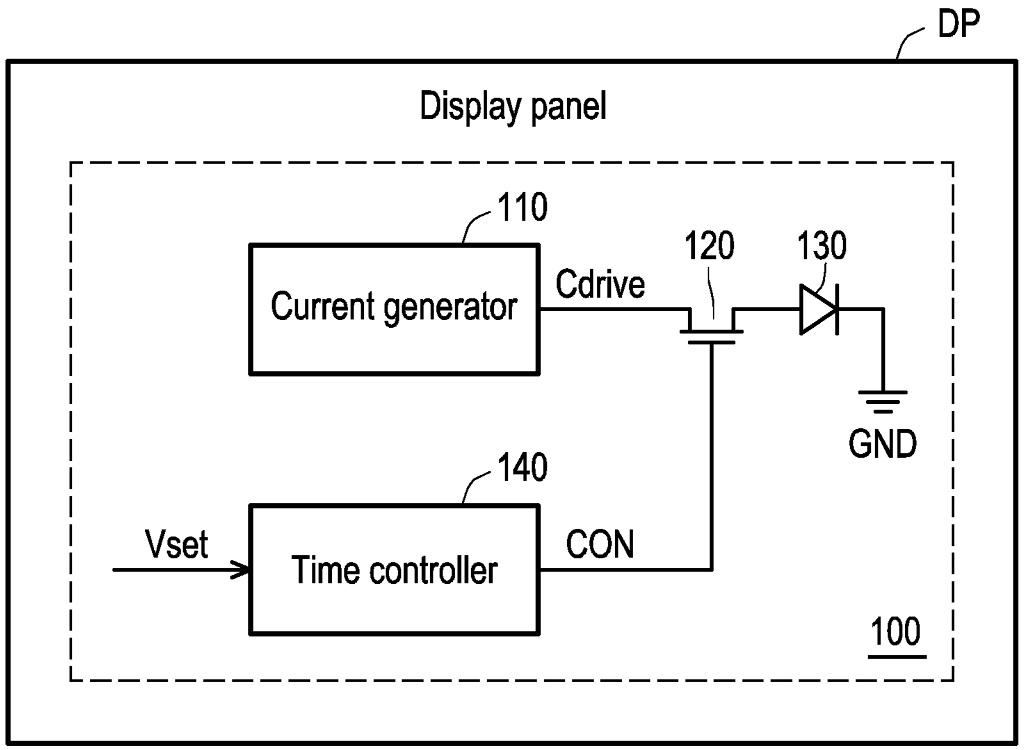
FIG. 1 is a schematic diagram of a pixel circuit according to an embodiment of the disclosure.

Parts of the embodiments of the disclosure will be described in details below with reference to the accompanying drawings. For the reference numerals used in the following description, the same reference numerals appearing in different drawings will be regarded as the same or similar components.

Referring to FIG. 1, FIG. 1 is a schematic diagram of a pixel circuit according to an embodiment of the disclosure. A pixel circuit 100 includes a current generator 110, a switch 120, a light-emitting component 130, and a time controller 140. The pixel circuit 100 is located in a display panel DP. The cathode of the light-emitting component 130 is coupled to a ground terminal GND. The current generator 110 provides a driving current Cdrive. In the embodiment, the current generator 110 may control the generated driving current Cdrive by means of a pulse amplitude modulation (PAM). Specifically, the driving current Cdrive is configured to determine the set brightness of the pixel circuit 100.

In the embodiment, the switch 120, the current generator 110, and the light-emitting component 130 may be coupled in series with one another. The switch 120 may be turned on or off according to a control signal CON. In the embodiment, the control signal CON may be a pulse width modulation (PWM) signal. The time controller 140 is configured to generate the control signal CON. The time controller 140 may receive the set voltage Vset, and adjust the pulse width of the control signal CON according to the voltage value of the set voltage Vset. Specifically, the time controller 140 may adjust the duty ratio of the pulse width of the control signal CON through the set voltage Vset, so as to adjust the percentage of time when the light-emitting component 130 is turned on in a unit time. That is to say, the time controller 140 may adjust the pulse width of the control signal CON according to the voltage value of the set voltage Vset.

In detail, when the control signal CON has a positive pulse width, the switch 120 may be turned on, and may provide the driving current Cdrive to the light-emitting component 130 to drive the light-emitting component 130 to emit light. Therefore, the pixel circuit 100 may adjust the brightness generated by the light-emitting component 130 by adjusting the duty ratio of the control signal CON based on the driving current Cdrive generated by the current generator 110.

In the embodiment, the current generator 110 sets the set brightness that the light-emitting component 130 may generate through the provided driving current Cdrive. The time controller 140 may slice the above-mentioned set brightness through the generated control signal CON to adjust the luminous brightness generated by the light-emitting component 130. In this way, through the adjustment of the driving current Cdrive and the pulse width of the control signal CON, the precision of the luminous brightness generated by the light-emitting component 130 may be more finely controlled and effectively improved. In other words, under high-bit display data (for example, 16 bits), the time controller 140 may precisely slice the brightness of the light-emitting component 130 to improve the saturation and quality of the picture.

In the embodiment, the light-emitting component 130 may be a micro light-emitting diode (Micro LED) or any form of light-emitting diodes. The switch 120 may be a transistor switch. For example, in the embodiment, the switch 120 may be constructed by an N-type metal oxide semi-conductor field-effect transistor (NMOSFET). In other embodiments of the disclosure, the switch 120 may be constructed by a P-type metal oxide semi-conductor field-effect transistor (PMOSFET), without specific limitations.

In the embodiment, multiple sub-pixels (not shown) may be disposed in the display panel DP. Each sub-pixel may include a pixel circuit 100. The multiple sub-pixels may be arranged in a matrix in the display panel DP.

In the embodiment, the multiple pixel circuits 100 may be disposed in a display area (not shown) of the display panel DP.

Figure 2A:
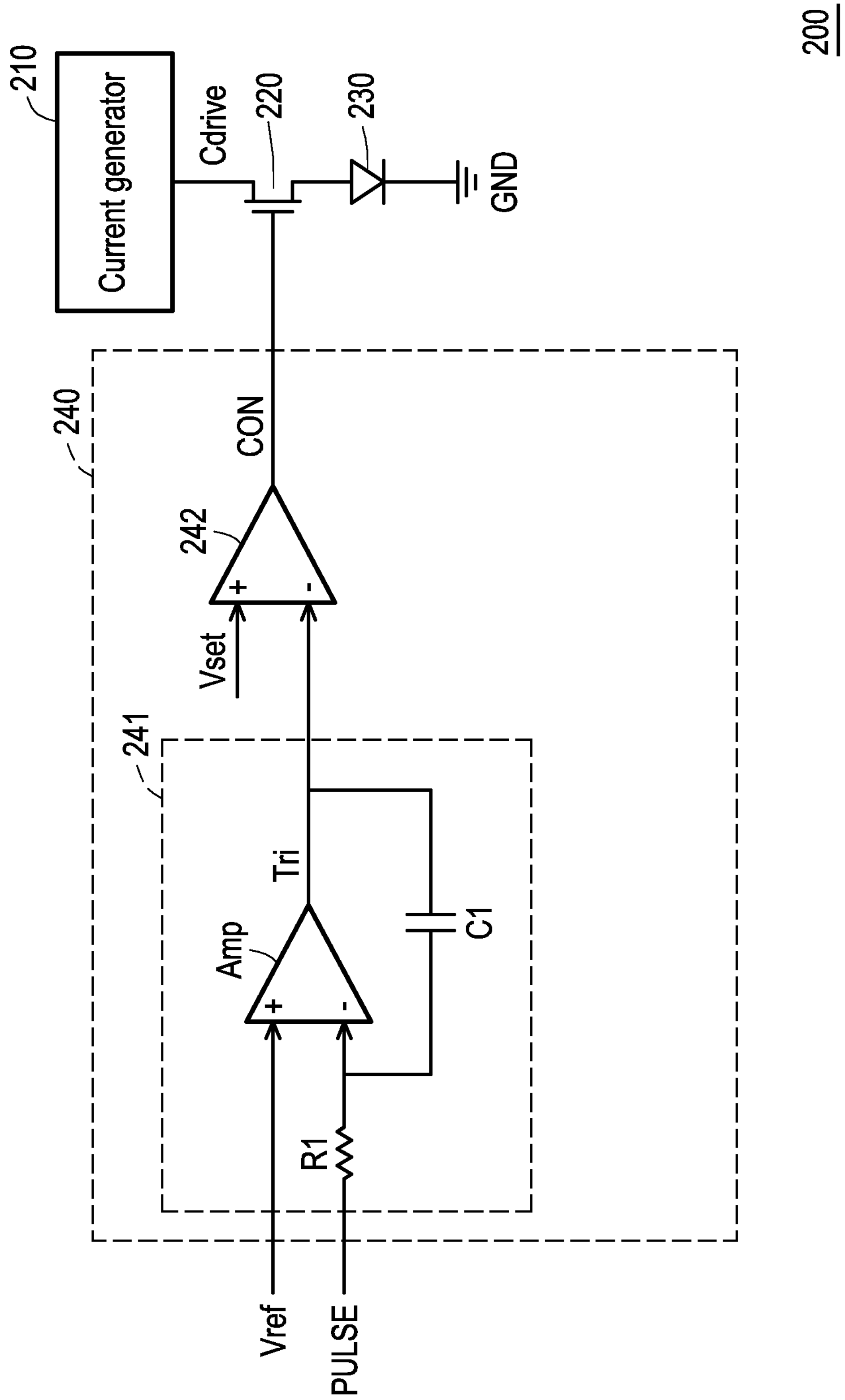
FIG. 2A is a schematic diagram of a pixel circuit according to an embodiment of the disclosure.

Referring to FIG. 2A. FIG. 2A is a schematic diagram of a pixel circuit according to an embodiment of the disclosure. In the embodiment, a pixel circuit 200 includes a current generator 210, a switch 220, a light-emitting component 230, and a time controller 240. The cathode of the light-emitting component 230 is coupled to the ground terminal GND. The time controller 240 includes a triangular wave generating circuit 241 and a comparator circuit 242. The triangular wave generating circuit 241 includes an operational amplifier Amp, a capacitor C1, and a resistor R1. The first input terminal of the operational amplifier Amp may receive a clock signal PULSE, the second input terminal of the operational amplifier Amp may receive a reference voltage Vref, and the output terminal of the operational amplifier Amp may generate a triangular wave signal Tri. The capacitor C1 is coupled between the output terminal of the operational amplifier Amp and the first input terminal of the operational amplifier Amp. The resistor R1 is connected in series between the paths where the first input terminal of the operational amplifier Amp receives the clock signal PULSE. The triangular wave generating circuit 241 generates the triangular wave signal Tri according to the clock signal PULSE. In the embodiment, the first input terminal of the operational amplifier Amp is a negative input terminal, and the second input terminal of the operational amplifier Amp may be a positive input terminal. In the embodiment, the reference voltage Vref may be a reference ground voltage (0 volts).

In addition, the comparator circuit 242 is coupled to the output terminal of the triangular wave generating circuit 241. The comparator circuit 242 receives the triangular wave signal Tri and the set voltage Vset, and compares the triangular wave signal Tri with the set voltage Vset to generate the control signal CON. In the embodiment, the set voltage Vset may be negatively correlated with the pulse width of the control signal CON.

Figure 2B:
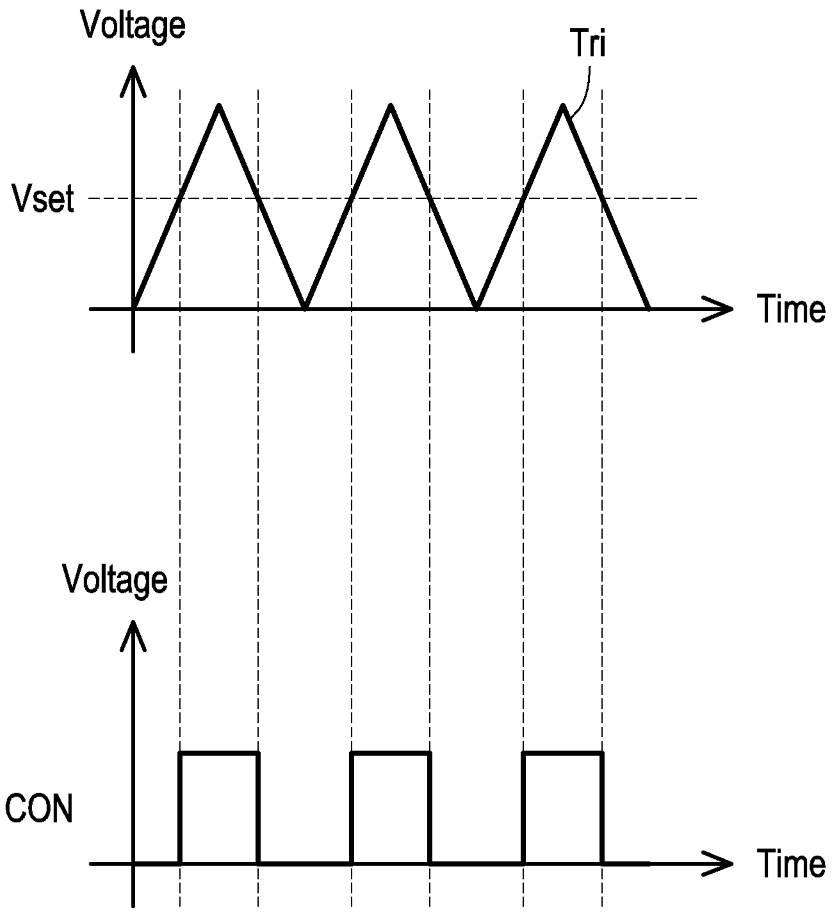
FIG. 2B is an action waveform diagram of the pixel circuit in the embodiment of FIG. 2A of the disclosure.

For example, the comparator circuit 242 may be constructed by an operational amplifier. The comparator circuit 242 may have a positive input terminal and a negative input terminal. The positive input terminal of the comparator circuit 242 may receive the triangular wave signal Tri, and the negative input terminal of the comparator circuit 242 may receive the set voltage Vset. Here, referring to FIG. 2A and FIG. 2B at the same time, wherein FIG. 2B is an action waveform diagram of the pixel circuit in the embodiment of FIG. 2A of the disclosure. When the triangular wave signal Tri is greater than the set voltage Vset, the comparator circuit 242 may output the control signal CON with the logic value of 1. On the contrary, when the triangular wave signal Tri is less than the set voltage Vset, the comparator circuit 242 may output the control signal CON with the logic value of 0. In the embodiment, if the set voltage Vset is smaller, the pulse width of a pulse signal CON is wider.

To further illustrate, in the embodiment, when the voltage value of the set voltage Vset is lower, the pulse signal CON generated by the time controller 240 may have a relatively greater duty ratio. That is, the pulse signal CON may have a relatively long positive pulse width. The switch 220 may be turned on corresponding to the positive pulse width of the pulse signal CON, and increase the time for providing the driving current Cdrive to the light-emitting component 230, so as to increase the brightness provided by the light-emitting component 230. In contrast, when the voltage value of the set voltage Vset is higher, the pulse signal CON generated by the time controller 240 may have a relatively lesser duty ratio. That is, the pulse signal CON may have a relatively short positive pulse width. The switch 220 is turned on corresponding to the positive pulse width of the pulse signal CON, and decreases the time for providing the driving current Cdrive to the light-emitting component 230, so as to decrease the brightness provided by the light-emitting component 230.

In the embodiment, the current generator 210 may be implemented by any form of pulse amplitude modulated current generation circuits known to those skilled in the art, without specific limitations.

Figure 3A:
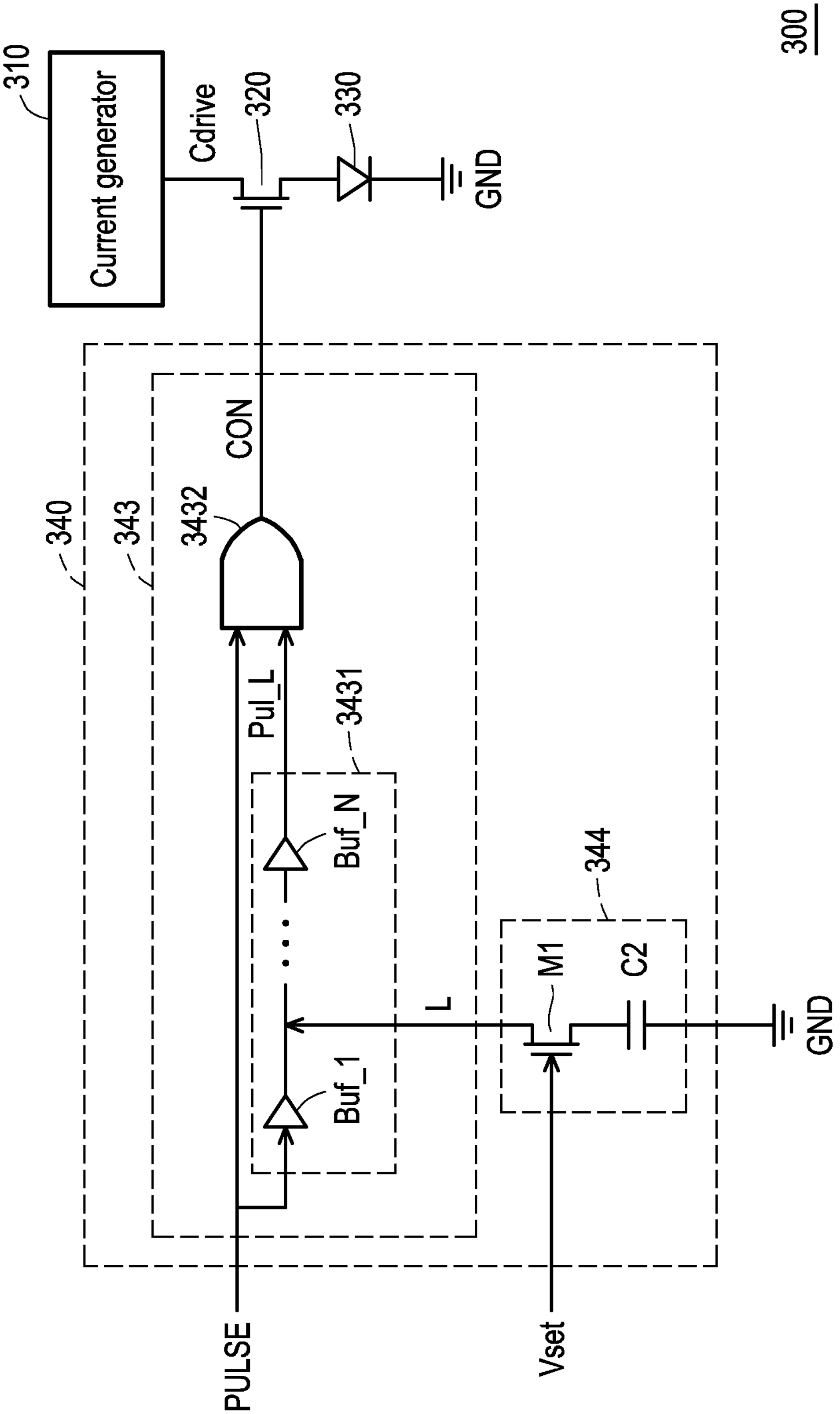
FIG. 3A is a schematic diagram of a pixel circuit according to an embodiment of the disclosure.

Referring to FIG. 3A. FIG. 3A is a schematic diagram of a pixel circuit according to an embodiment of the disclosure. In the embodiment, a pixel circuit 300 includes a current generator 310, a switch 320, a light-emitting component 330, and a time controller 340. The time controller 340 includes a logic operation circuit 343 and a delay amount adjustment circuit 344. The logic operation circuit 343 includes buffers Buf_1 to Buf_N and a logic gate 3432. The buffers Buf_1 to Buf_N are coupled in series to form a delay string 3431. The delay string 3431 is configured to delay the clock signal PULSE to generate a delayed clock signal Pul_L. The logic gate 3432 performs logic operations on the clock signal PULSE and the delayed clock signal Pul_L to generate the control signal CON. In the embodiment, the logic gate 3432 may be an AND gate. In the embodiment, the number of buffers Buf_1 to Buf_N may be designed according to requirements and the disclosure does not limit. The buffers Buf_1 to Buf_N may be non-inverting output buffers, or may also be inverters. When the buffers Buf_1 to Buf_N are inverters, the number of buffers Buf_1 to Buf_N may be an even number.

The delay amount adjustment circuit 344 is coupled to the logic operation circuit 343. The delay amount adjustment circuit 344 provides a delay amount L according to the set voltage Vset. The delay amount adjustment circuit 344 includes a transistor M1 and a capacitor C2. The first terminal of the transistor M1 is coupled to the output terminal of the buffer Buf_1. The second terminal of the transistor M1 is coupled to the first terminal of the capacitor C2. The second terminal of the capacitor C2 is coupled to a reference ground terminal GND. The control terminal of the transistor M1 receives the set voltage Vset. In the embodiment, the cathode of the light-emitting component 330 may share the ground with the second terminal of the capacitor C2.

The logic operation circuit 343 receives the clock signal PULSE, and delays the clock signal PULSE according to the delay amount L to generate the delayed clock signal Pul_L. In addition, the logic operation circuit 343 performs logic operations on the clock signal PULSE and the delayed clock signal Pul_L to generate the control signal CON, wherein the set voltage Vset is positively correlated with the pulse width of the control signal CON.

Figure 3B:
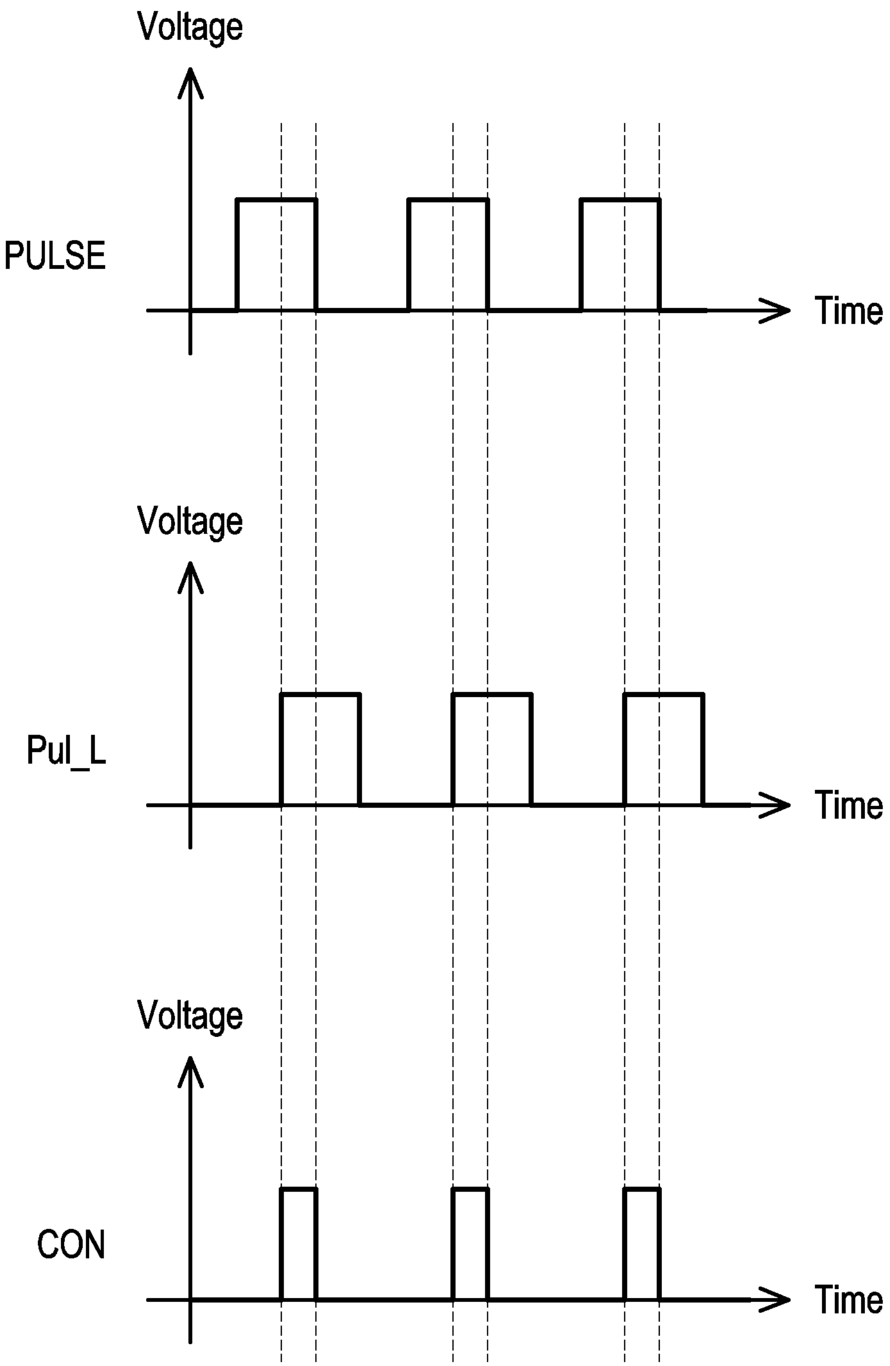
FIG. 3B is an action waveform diagram of the pixel circuit in the embodiment of FIG. 3A of the disclosure.

Specifically, both the clock signal PULSE and the delayed clock signal Pul_L may be square waves, and the logic gate 3432 is an AND gate. The delayed clock signal Pul_L and the clock signal PULSE may have a phase difference. Referring to FIG. 3A and FIG. 3B at the same time below, wherein FIG. 3B is an action waveform diagram of the pixel circuit in the embodiment of FIG. 3A of the disclosure. When the clock signal PULSE and the delayed clock signal Pul_L are both at the logic value of 1, the output of the logic gate 3432 is the control signal CON with the logic value of 1. On the contrary, when at least one of the clock signal PULSE and the delayed clock signal Pul_L is at the logic value 0, the logic gate 3432 may output the control signal CON with the logic value of 0. Therefore, if the set voltage Vset is greater, the phase difference between the clock signal PULSE and the delayed clock signal Pul_L may be lesser, and the positive pulse width of the control signal CON may be wider.

Therefore, when it is necessary to increase the brightness of the light-emitting component 330, the positive pulse width of the control signal CON may be increased through increasing the voltage value of the set voltage Vset and decreasing the phase difference between the clock signal PULSE and the delayed clock signal Pul_L, pulse width. In contrast, when it is necessary to lower the luminance of the light-emitting component 330, the positive pulse width of the control signal CON may be decreased through decreasing the voltage value of the set voltage Vset and increasing the phase difference between the clock signal PULSE and the delayed clock signal Pul_L.

The positive pulse of the control signal CON may turn on the switch 320 and transmit the driving current Cdrive to the light-emitting component 330 to drive the light-emitting component 330 to emit light. Therefore, through adjusting the positive pulse width of the control signal CON, the adjustment action of the luminous brightness of the light-emitting component 330 may be effectively performed.

Figure 4:
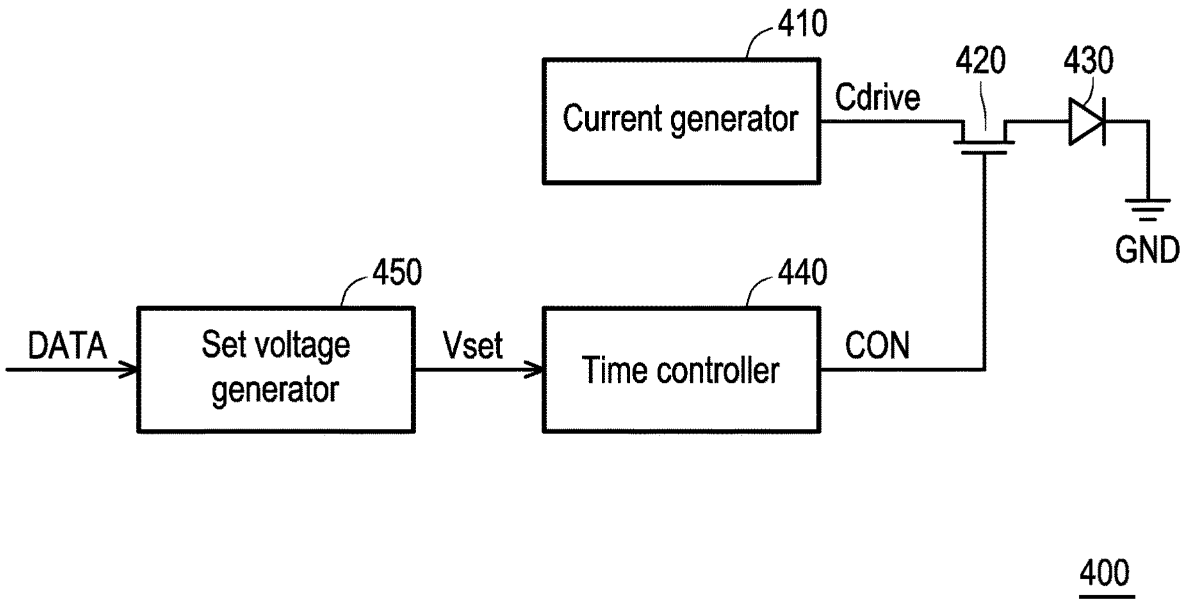
FIG. 4 is a schematic diagram of a pixel circuit according to an embodiment of the disclosure.

Referring to FIG. 4. FIG. 4 is a schematic diagram of a pixel circuit according to an embodiment of the disclosure. In the embodiment, a pixel circuit 400 includes a current generator 410, a switch 420, a light-emitting component 430, a time controller 440, and a set voltage generator 450. The set voltage generator 450 receives the display data DATA, and generates the set voltage Vset according to the gray scale value of the display data DATA. Specifically, the time controller 440 adjusts the pulse width of the control signal CON according to the set voltage Vset. Since the pulse width of the control signal CON determines the lighting ratio of the pixel circuit 400, the set voltage generator 450 may generate the set voltage Vset meeting the actual requirement by means of the gray scale value of the display data DATA. The time controller 440 then generates the control signal CON according to the set voltage Vset control signal. In this way, after the current generator 410 provides the driving current Cdrive, which means to determine the maximum brightness of the pixel circuit 100, the control signal CON turns on the switch 420 to switch the brightness of the light-emitting component 430.

The implementation details of the current generator 410, the switch 420, the light-emitting component 430, and the time controller 440 have been described in detail in the foregoing embodiments, and will not be repeated here.

To sum up, the pixel circuit of the disclosure may adjust the brightness through the control signal, wherein the control signal is the pulse width modulation signal. Specifically, the width of the control signal reflects the lighting ratio of the pixel circuit in a unit time period. In this way, the pixel circuit may slice the gray scale value through the control signal generated by the time controller, thereby reducing the requirement on the control precision of the components. In addition, the set voltage generator may generate a set voltage according to the gray scale value of the display data, so as to meet the actual requirement.

What is claimed is:

1. A pixel circuit, disposed in a display panel, comprising:

a current generator, configured to provide a driving current, wherein the current generator controls the driving current according to a pulse amplitude modulation mechanism;

a switch, coupled in series with the current generator and a light-emitting component, and being turned on or off according to a control signal, wherein the control signal is a pulse width modulation signal;

a set voltage generator, wherein the set voltage generator receives display data, and generates a set voltage according to a gray scale value of the display data;

a time controller, configured to generate the control signal, wherein the time controller receives the set voltage, and adjusts a pulse width of the control signal according to a voltage value of the set voltage generated by the set voltage generator according to the display data, wherein the time controller comprises:

a triangular wave generating circuit, generating a triangular wave signal according to a clock signal; and a comparator circuit, coupled to the triangular wave generating circuit, and comparing the triangular wave signal with the set voltage to generate the control signal, wherein the triangular wave generating circuit comprises:

an operational amplifier, wherein the operational amplifier has a first input terminal to receive the clock signal, a second input terminal to receive a reference voltage, and an output terminal to generate the triangular wave signal; and a capacitor, coupled between the output terminal of the operational amplifier and the first input terminal of the operational amplifier.

2. The pixel circuit according to claim 1, wherein the first input terminal of the operational amplifier is a negative input terminal, and the second input terminal of the operational amplifier is a positive input terminal.

3. The pixel circuit according to claim 1, wherein the triangular wave generating circuit further comprises:

a resistor, connected in series between paths where the first input terminal of the operational amplifier receives the clock signal.

4. The pixel circuit according to claim 1, wherein the set voltage is negatively correlated with the pulse width of the control signal.

5. The pixel circuit according to claim 1, wherein the time controller comprises:

a logic operation circuit, wherein the logic operation circuit receives a clock signal, delays the clock signal according to a delay amount to generate a delayed clock signal, and performs logic operations on the clock signal and the delayed clock signal to generate the control signal; and a delay amount adjustment circuit, coupled to the logic operation circuit, and configured to provide the delay amount according to the set voltage.

6. The pixel circuit according to claim 5, wherein the logic operation circuit comprises:

a plurality of buffers, sequentially coupled in series to form a delay string, wherein the delay string is configured to delay the clock signal to generate the delayed clock signal;

a logic gate, wherein the logic gate performs the logic operations on the clock signal and the delayed clock signal to generate the control signal.

7. The pixel circuit according to claim 6, wherein the delay amount adjustment circuit comprises:

a transistor, wherein the transistor has a first terminal coupled to a coupling terminal of a first buffer and a second buffer, a second terminal coupled to a reference ground terminal, and a control terminal receiving the set voltage.

8. The pixel circuit according to claim 7, wherein the delay amount adjustment circuit further comprises:

a capacitor, coupled between the second terminal of the transistor and the reference ground terminal.

9. The pixel circuit according to claim 6, wherein the logic gate is an AND gate.

10. The pixel circuit according to claim 5, wherein the set voltage is positively correlated with the pulse width of the control signal.

11. The pixel circuit according to claim 1, wherein the light-emitting component is a micro light-emitting diode, and the switch is a transistor switch.

12. A display panel, comprising:

a plurality of sub-pixels, wherein the sub-pixels are configured as a matrix, each of the sub-pixels comprises a pixel circuit, and the pixel circuit comprises:

a current generator, configured to provide a driving current, wherein the current generator controls the driving current according to a pulse amplitude modulation mechanism;

a switch, coupled in series with the current generator and a light-emitting component, and being turned on or off according to a control signal, wherein the control signal is a pulse width modulation signal;

a set voltage generator, wherein the set voltage generator receives display data, and generates a set voltage according to a gray scale value of the display data;

a time controller, configured to generate the control signal, wherein the time controller receives the set voltage, and adjusts a pulse width of the control signal according to a voltage value of the set voltage generated by the set voltage generator according to the display data, wherein the time controller comprises:

a triangular wave generating circuit, generating a triangular wave signal according to a clock signal; and a comparator circuit, coupled to the triangular wave generating circuit, and comparing the triangular wave signal with the set voltage to generate the control signal, wherein the triangular wave generating circuit comprises:

an operational amplifier, wherein the operational amplifier has a first input terminal to receive the clock signal, a second input terminal to receive a reference voltage, and an output terminal to generate the triangular wave signal; and a capacitor, coupled between the output terminal of the operational amplifier and the first input terminal of the operational amplifier.

13. The display panel according to claim 12, wherein the pixel circuit is configured in a display area of the display panel.

* * * * *